Aug. 1, 1939.   A. LESPONNE   2,167,898
GRAPEFRUIT IMPLEMENT
Filed June 15, 1938
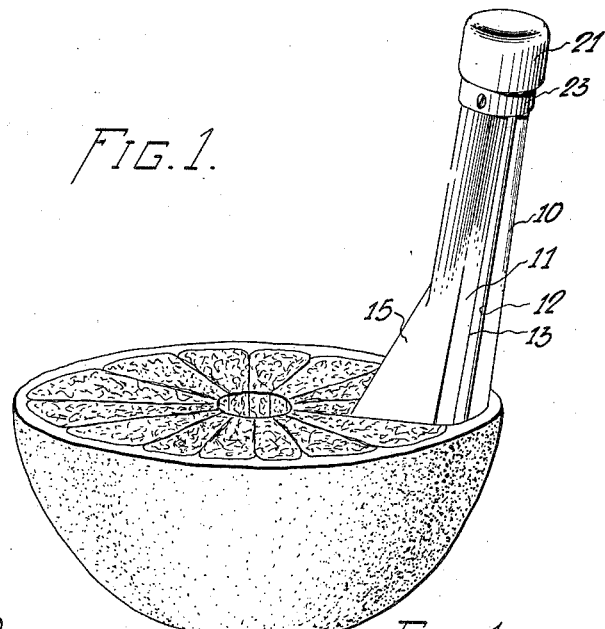
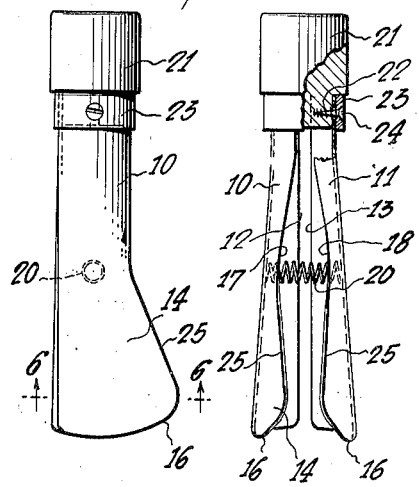
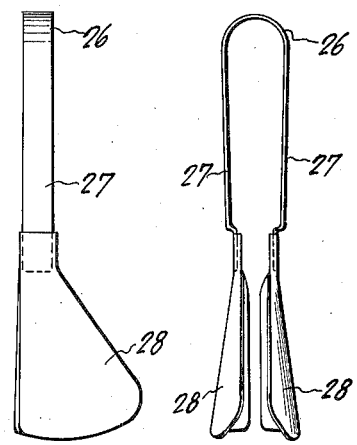
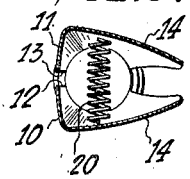
INVENTOR
ALBAN LESPONNE
BY *J. Ledermann*
ATTORNEY Patented Aug. 1, 1939

2,167,898

UNITED STATES PATENT OFFICE 2,167,898

GRAPEFRUIT IMPLEMENT

Alban Lesponne, New York, N. Y.

Application June 15, 1938, Serial No. 213,844

1 Claim. (Cl. 30—24)

The main object of this invention is the provision of a novel implement for quickly and conveniently removing or loosening the sections of a half-grapefruit from the skin or shell, the implement being at the same time efficient in operation for the purpose set forth, and inexpensive in cost of manufacture.

Another object of the invention is the provision of such an implement having the feature of adjustability to accommodate the varying sizes of different sections of the same fruit.

The above and other objects will become apparent in the description below, in which characters of reference refer to like-named characters in the drawing.

Referring briefly to the drawing,

Figure 1 is a perspective view illustrating the application of the implement.

Figure 2 is a side elevational view of the same.

Figure 3 is a front elevational view of the implement, partly in section.

Figure 4 is a side elevational view of a modified form of the implement.

Figure 5 is a front elevational view of the latter.

Figure 6 is a cross-sectional view taken on the line 6—6 of Figure 2.

Referring in detail to the drawing, the numeral 10 represents one of a pair of oppositely-disposed blade arms substantially U-shaped in cross-section, having their rear edges lying spaced-apart and substantially parallel with each other. The lower end of each arm 10 and 11 is extended in an arched cutting blade 14 and 15, respectively, the lower edge of each blade being used as a cutting edge, as shown at 16.

The front edges 17 and 18 of the blade arms are each cut out at their midportions, and a coiled compression spring 20 is mounted between the arms 10 and 11 at the cut-out edges 17 and 18 by having its ends secured in the hollows of the arms. A handle 21 is provided for the implement, and has an extension 22 on which the upper ends of the arms 10 and 11 are secured by means of a band 23 and screws 24. It is obvious that the arms are pivotable by means of their flexibility through a small arc about their attachment on the handle extension 23. The upper angular edge 25 of each blade 14 and 15 is also sharpened.

In use, the implement is inserted into the surface of the fruit as shown in Figure 1, pressure being applied by the fingers to force the two arms together until the blades accommodate the width of the section about to be loosened. Then the blades are urged toward the core (which has been previously cut out in the usual manner), in the case of large fruits. Ordinarily, however, the cutting edges 16 are sufficient to loosen the section. The spring 20 will return the arms to their widest position when pressure of the fingers is released.

In the modification shown in Figures 4 and 5, the handle 26 comprises a U-shaped member having a pair of resilient parallel arms 27. Secured on each arm 27, is a blade member 28, these blades being identical in structure and outline to the blades 14 and 15. The operation of this modified form is the same as that previously set forth.

Obviously, modifications in form and structure may be made without departing from the spirit and scope of the invention.

I claim:

An implement of the class described comprising a cylindrical handle, a pair of oppositely-disposed arms arcuate in cross-section having their ends secured to opposite sides of one end of said handle, a band surrounding said ends and retaining said ends on said handle, the opposite ends of said arms having channel shaped blades thereon with the channels facing inwardly, said arms being flexible through a small arc about their attachment to said handle, and resilient means normally urging said blades and arms apart.

ALBAN LESPONNE.